April 9, 1957 R. B. BEARD 2,787,904
CONSTITUENT POTENTIAL MEASURING APPARATUS
Filed June 29, 1953

INVENTOR.
RICHARD B. BEARD
BY Arthur H. Swanson
ATTORNEY.

United States Patent Office 2,787,904
Patented Apr. 9, 1957

2,787,904

CONSTITUENT POTENTIAL MEASURING APPARATUS

Richard B. Beard, Philadelphia, Pa., assignor to Minneapolis-Honeywell Regulator Company, Minneapolis, Minn., a corporation of Delaware Application June 29, 1953, Serial No. 364,712

6 Claims. (Cl. 73—27)

A general object of the present invention is to provide a new and improved apparatus for indicating a constituent potential of a furnace atmosphere in a heat treating furnace. More specifically, the apparatus of the present invention is directed to measuring a constituent potential of a heat treating atmosphere by an electrical resistance measurement where the measuring means is characterized by its extended life and freedom from deterioration effects tending to be caused by ambient conditions.

The accurate control of a heat treating atmosphere depends in part upon the accurate measurement of the constituent potential of the constituent which is being used to treat a metal within the furnace. The two most common constituents used in the heat treating of metals are nitrogen and carbon. The atmosphere of a furnace used to form a nitrogen case on a metal is generally referred to as a nitriding atmosphere. When carbon is to be used in forming a case on a metal, the atmosphere used in the heat treating process is generally referred to as a carburizing atmosphere.

Whether a nitriding or a carburizing atmosphere is being examined, it is necessary to accurately observe the carbon potential or the nitrogen potential of the atmosphere in order to determine the rate at which nitrogen or carbon will be sorbed in the surface of the metal being treated. Metals most frequently being heat treated are in the ferrous classification. One method of determining the nitrogen or carbon potential of the heat treating atmosphere is to place an iron resistance wire into the furnace atmosphere and observe its electrical resistance changes. The iron wire, as well as the material being heat treated, will tend to sorb or give up the heat treating constituent depending upon whether the constituent potential of the atmosphere is greater or less than the constituent sorbed in the surface of the metal. Thus, an iron measuring wire placed in the furnace, if of sufficiently small diameter, will tend to follow the constituent potential changes of the atmosphere of the furnace and therefore provide a means for indicating the constituent potential of the atmosphere.

The use of a resistance element for determining constituent potential is accompanied by the principal difficulty of deterioration of the sensing element with the result that the life of the element is extremely short and the accuracy of the element is not consistent. It has heretofore been the practice of frequently replacing the sensing element and providing special atmospheric protective means for the element to try to hold the element at a fixed relation to the heat treating atmosphere at the start of each heat treating operation. As the resistance elements are generally temperature compensated, this method of measurement is satisfactory only so long as the basic structure of the sensing element does not change as it is heat treated and then brought back to its starting position. As this condition is not attainable, it is necessary to provide some other means for determining the constituent potential of the atmosphere where the sensing elements will not be subject to the deficiencies of the single resistance sensing element.

It has been found that different alloys will have different electrical resistances with the difference of the resistances being dependent upon the percent of carbon sorbed in the metal. It is this principle which is incorporated in the present apparatus for measuring furnace atmosphere constituent potential.

It is therefore a more specific object of the present invention to provide an improved constituent potential measuring apparatus which employs a pair of resistance elements whose resistances vary by different amounts in accordance with the amount of a constituent sorbed therein.

Another more specific object of the present invention is to provide an improved constituent potential measuring apparatus for a heat treating atmosphere employing a pair of metallic resistance elements which respond differently to the amount of the constituent sorbed therein where those resistance elements are connected into an electrical resistance measuring circuit which measures the resistance difference between the two elements to determine the constituent potential of the atmosphere.

Still another more specific object of the present invention is to provide an improved constituent potential sensing apparatus for a heat treating furnace atmosphere employing a pair of resistance elements of different alloys connected to a resistance measuring apparatus with temperature compensating means responding to the ambient temperature of the sensing element.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Figure 1:
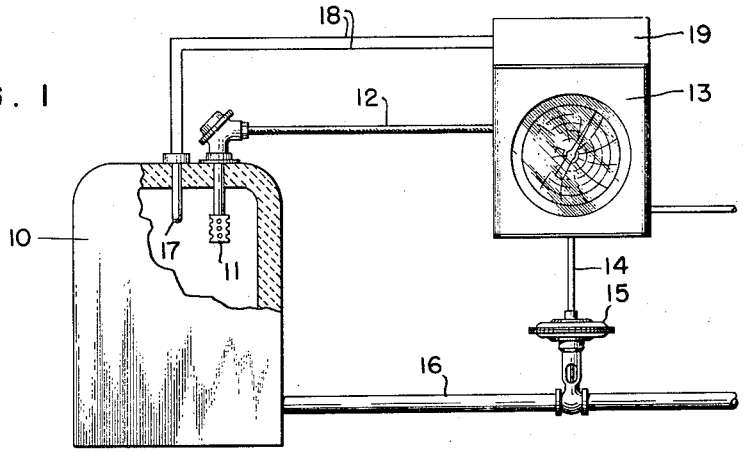
Fig. 1 is a diagrammatic showing of the present invention as applied to a heat treating furnace.

Referring to Fig. 1, the numeral 10 represents a furnace wherein it is desired to determine the constituent potential of a heat treating atmosphere placed within the furnace. A suitable housing 11 projects into the furnace and carries the sensing elements which are used for determining the constituent potential. The output electrical leads 12 from the housing 11 are connected to a suitable indicating and recording mechanism 13. This indicating and recording mechanism may well take the form of the apparatus disclosed and claimed in the patent to Walter P. Wills, No. 2,423,540, issued July 8, 1947. If desired, the instrument 13 may also be used for controlling purposes with the instrument producing an output air pressure in a conduit 14 which is used to control the operation of a pneumatic valve 15. The valve 15 may in turn be used to control the flow of an enriching gas to the furnace 10 by way of a conduit 16.

Also present within the furnace 10 is a temperature sensing element 17 which is connected by leads 18 to a suitable instrument 19 which will have an electrical output proportional to the temperature within the furnace 10.

The operation of the apparatus shown in Fig. 1 is that the sensing element 11 will determine the constituent potential of the furnace atmosphere in the furnace 10 and will produce an electrical output on the leads 12 which will be fed into the instrument 13. The instrument 13 will give a visual indication of the constituent potential in the furnace and will produce an output pressure proportional to that constituent potential. This output pressure may be used to regulate the valve 15 so as to vary the flow of the enriching gas to the furnace and therefore regulate the constituent potential in the furnace. The element 17 will serve to provide a temperature compensating signal which will compensate for temperature variations in the furnace 10. In furnaces where the temperature is accurately controlled, the need for the temperature compensation is eliminated.

Figure 2:
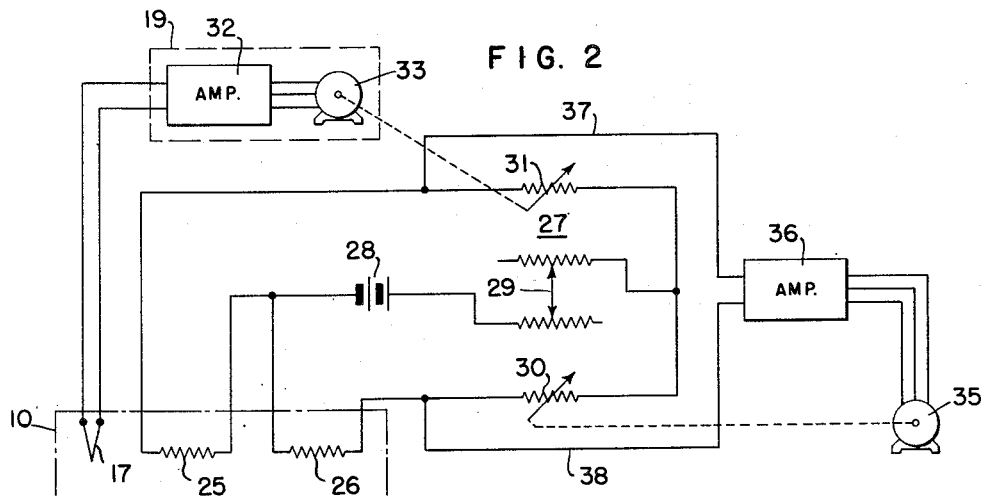
Fig. 2 is a showing of the electrical circuit which may be used in conjunction with the sensing elements of the present apparatus.

Referring to Fig. 2, this figure shows the basic electrical circuit which incorporates the constituent potential sensing means which are placed within the furnace 10, shown in Fig. 1. These sensing elements are identified by the numerals 25 and 26. These elements are selected so that the electrical resistance of the element 25, for example, will always be more than the electrical resistance of the element 26 and the resistances of both of the elements will change by different amounts depending upon the percent carbon sorbed by the element. Thus, referring to Fig. 3, there is graphically shown representative resistance changes expected from the alloys with the percent carbon sorbed varying. It will be noted that the alloy 25 has a relatively high slope while the alloy 26 has a relatively low slope. Representative examples for metals or alloys suitable for use in the elements 25 and 26 respectively are pure iron and iron alloyed with 2.5% chromium, 0.3% silicon, and 0.2% manganese.

Referring back to Fig. 2, the resistance elements 25 and 26 are connected into an electrical network 27 which has power supplied thereto by a suitable battery 28 with an adjustable resistor 29 in series therewith. Network 27 also includes a followup or rebalancing resistor 30 and a resistor 31 which is adjusted in accordance with temperature variations in the furnace 10. These temperature variations are detected by the thermocouple 17 which controls the operation of a suitable amplifier 32 which is arranged to reversibly drive the motor 33. The rebalancing resistor 30 is arranged to be positioned by a rebalancing motor 35 which is driven by an amplifier 36 receiving its input signal from the output leads 37 and 38 connected to the network 27.

The operation of the apparatus shown in Fig. 2 may best be understood by first noting that the resistance elements 25 and 26 are connected so that they are in opposition in the electrical network 27 with the network being so arranged that it may be balanced by the operation of the balancing resistor 30. Thus, any unbalance existing in the network 27 will appear on the output leads 37 and 38 on the input of the amplifier 36 and this amplifier will in turn drive the motor 35 in a direction and to an extent necessary to cause the resistor 30 to be moved to a position to balance the network 27.

Figure 3:
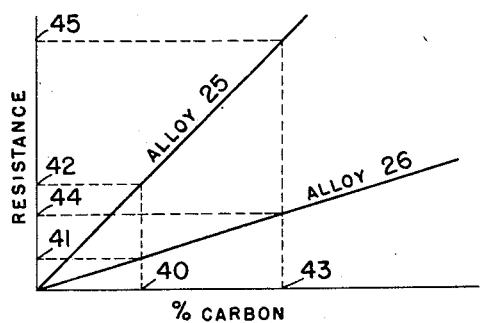
Fig. 3 is a graph showing the representative resistance versus carbon percentage characteristics for a pair of alloys.

Referring to Fig. 3, it will be seen that the manner in which the electrical resistance of the elements 25 and 26 change with percent carbon. Let it be assumed that initially the percent carbon is that as represented by the point 40. The resistance to the alloy 26 will thus be indicated by the point 41. For the same percentage of carbon as represented by the point 40, the alloy 25 will have a resistance indicated by the point 42. With this electrical resistance difference between the alloys 25 and 26 for the percent carbon indicated by the point 40, the resistor 30 will be adjusted to balance the network 27. The amount of adjustment required will be an indication of the percent of carbon sorbed in the elements 25 and 26 which in turn will be indicative of the carbon potential of the atmosphere.

Should the carbon potential change in the furnace be such that the carbon sorbed in the elements 25 and 26 to the extent as represented by the point 43, the electrical resistance of the alloy 26 will now be represented by the point 44 and the electrical resistance of the alloy 25 will be represented by the point 45. The difference in resistance between the elements 25 and 26 is now represented by the difference between the points 44 and 45 and it is this difference which will create an unbalance on the network 27 which is eliminated by the adjustment of the resistor 30 by the motor 35. Again, the amount of adjustment required of the resistor 30 will be an indication of the percent carbon of the elements 25 and 26 and therefore the constituent potential of the atmosphere within the furnace 10.

As mentioned above, most heat treating furnaces have temperature controls which maintain the temperature of the furnaces substantially constant. In the event that a particular furnace does not have an adequate temperature control, it is necessary that some compensation be added into the network 27 to compensate for the changes in resistance of the elements 25 and 26 due to furnace temperature changes. This may readily be accomplished by adding a thermocouple such as the thermocouple 17 which, operating through the amplifier 32 and the motor 33, will adjust the resistor 31 to shift the balance of the network 27 in a direction to compensate for temperature changes in the furnace. The temperature compensation required will be dependent upon the selection of the alloys used in the sensing elements 25 and 26.

It will thus be seen that the apparatus shown in Fig. 2 may be used to accurately determine the constituent potential of the furnace atmosphere within the furnace 10. It will be readily apparent that since both of the elements 25 and 26 are positioned directly within the furnace and are exposed to the ambient conditions within the furnace that their rate of deterioration will be substantially the same. While the resistances of both of the elements 25 and 26 will tend to change with time, the differences in the resistances will tend to remain constant for any fixed percentage of carbon so that so long as a difference measurement is made, the apparatus will be effectively insensitive to the deterioration. In this way, the life of the elements will be considerably extended beyond that normally expected of a single sensing element.

Figure 4:
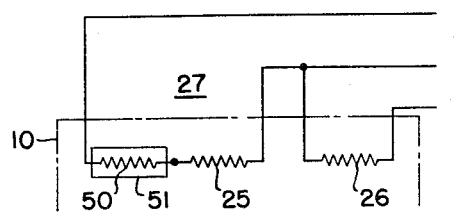
Fig. 4 shows a modification of the apparatus shown in Fig. 2 wherein temperature compensation is accomplished in the resistance network.

Fig. 4 shows one manner in which the network 27 may be modified to accomplish temperature compensation. Here, a temperature compensating resistor 50 has been added in series with the element 25. This element is placed within an enclosure 51 which isolates the atmosphere from the resistor 50 but allows the resistor 50 to assume the temperature of the atmosphere within the furnace 10. As is the case with the temperature compensation used in Fig. 2, this compensation may be used in furnaces wherein the temperature is not accurately controlled or where the need arises due to the selection of the alloys for the elements 25 and 26.

As it is well known that the inductance of an element will change in an iron element with changes in the amount of carbon sorbed, the principles set forth above are equally applicable to inductance changes as well as the resistance changes. The measurement of such inductance changes may readily be accomplished by means well known in the art.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. Apparatus for determining the carbon potential of a heat treating atmosphere comprising, a pair of ferrous elements having different basic components therein adapted to be positioned directly within a space containing the heat treating atmosphere so that said elements will sorb an amount of carbon dependent upon the carbon potential of the atmosphere, and electrical resistance measuring means connected to said elements to measure the resistance difference between said elements, said resistance difference indicating the carbon potential of the heat treating atmosphere.

2. Apparatus for determining the carbon potential of a heat treating atmosphere comprising, a pair of ferrous elements having different basic components therein adapted to be positioned directly within a space containing the heat treating atmosphere so that said elements will sorb an amount of carbon dependent upon the carbon potential of the atmosphere, a balanceable electrical network including said elements as arms thereof, and electrical balancing means for adjusting said network until an electrical balance is attained with the balance point being an indication of the carbon potential of the heat treating atmosphere.

3. Apparatus for determining the carbon potential of a heat treating atmosphere comprising, a pair of ferrous elements having different basic components therein adapted to be positioned directly within a space containing the heat treating atmosphere so that said elements will sorb an amount of carbon dependent upon the carbon potential of the atmosphere, said elements each assuming a different electrical resistance dependent upon the amount of carbon sorbed, means for measuring the resistance differences of said elements, and atmosphere temperature sensing means connected to said resistance difference measuring means to compensate for temperature changes of said pair of elements.

4. Apparatus for determining the carbon potential of a heat treating atmosphere comprising, a pair of ferrous elements having different basic components therein adapted to be positioned directly within a space containing the heat treating atmosphere so that said elements will sorb an amount of carbon dependent upon the carbon potential of the atmosphere, a balanceable electrical network including said elements as arms thereof, temperature compensating means connected to said network to vary the balance thereof in accordance with the temperature of said elements, and electrical balancing means for adjusting said network until an electrical balance is attained with the balance point being an indication of the carbon potential of the heat treating atmosphere.

5. Apparatus as claimed in claim 4 wherein said temperature compensating means comprises a thermoelectric means, electrical amplifying means connected to said thermoelectric means, and means driven by said amplifying means for varying the balance of said network.

6. Apparatus as claimed in claim 4 wherein said temperature compensating means comprises a temperature sensitive resistor which is shielded from the atmosphere but sensitive to the temperature thereof.

References Cited in the file of this patent

UNITED STATES PATENTS

| | | |
|---|---|---|
| 2,149,441 | Jacobson | Mar. 7, 1939 |
| 2,255,551 | Willenborg | Sept. 9, 1941 |
| 2,279,231 | Gier | Apr. 7, 1942 |
| 2,279,397 | Hartline | Apr. 14, 1942 |
| 2,459,618 | Cartier | Jan. 18, 1949 |
| 2,541,857 | Besselman et al. | Feb. 13, 1951 |
| 2,583,930 | Cotton | Jan. 29, 1952 |
| 2,596,992 | Fleming | May 20, 1952 |
| 2,698,222 | Davis | Dec. 28, 1954 |